United States Patent
Sonetaka

(10) Patent No.: US 6,591,107 B1
(45) Date of Patent: Jul. 8, 2003

(54) METHOD OF ASSIGNING SERVICE CHANNEL

(75) Inventor: Noriyoshi Sonetaka, Tokyo (JP)

(73) Assignee: NEC Corporation, Tokyo (JP)

( * ) Notice: Subject to any disclaimer, the term of this patent is extended or adjusted under 35 U.S.C. 154(b) by 202 days.

(21) Appl. No.: 09/589,351

(22) Filed: Jun. 8, 2000

(30) Foreign Application Priority Data

Jun. 8, 1999 (JP) .......................................... 11-160628

(51) Int. Cl.[7] ............................................... H04Q 7/20
(52) U.S. Cl. ....................................... 455/450; 455/513
(58) Field of Search ................................ 655/450, 452, 655/521, 509, 512, 513, 527

(56) References Cited

U.S. PATENT DOCUMENTS

| | | | | |
|---|---|---|---|---|
| 5,815,799 A | * | 9/1998 | Barnes et al. ................ | 455/450 |
| 6,192,248 B1 | * | 2/2001 | Solondz ....................... | 455/450 |
| 6,208,865 B1 | * | 3/2001 | Veerasamy .................. | 455/450 |
| 6,335,922 B1 | * | 1/2002 | Tiedemann et al. .......... | 370/335 |

FOREIGN PATENT DOCUMENTS

| | | |
|---|---|---|
| JP | 59-89044 | 5/1984 |
| JP | 64-55929 | 3/1989 |
| JP | 6-189361 | 7/1994 |
| JP | 6-509456 | 10/1994 |
| JP | 9-187065 | 7/1997 |
| JP | 2760375 | 3/1998 |
| WO | 94/08434 | 4/1994 |

* cited by examiner

Primary Examiner—Nguyen T. Vo
Assistant Examiner—Tu Nguyen
(74) Attorney, Agent, or Firm—Young & Thompson

(57) ABSTRACT

There is provided a method of assigning service channel to traffic in communication system in which a subscriber's terminal is in communication with a base station through radio signals, including the steps of (a) reserving the predetermined number of channels in advance for traffic having a predetermined service rank, and (b) assigning channel preserved in advance, to the traffic having a predetermined service rank, only when there is no channel to be assigned to the traffic having a predetermined service rank. The method makes it possible to assign radio-signal channel to traffic having a high service rank, even if radio-signal channels are all occupied by traffics each having a low service rank.

7 Claims, 6 Drawing Sheets

METHOD OF ASSIGNING SERVICE CHANNEL

BACKGROUND OF THE INVENTION

1. Field of the Invention

The invention relates to a method of assigning service channel to traffic in communication system in which a subscriber's terminal is in communication with a base station through radio signals.

2. Description of the Related Art

There have been suggested many methods of assigning channel to traffic in communication system. For instance, such methods are suggested in Japanese Unexamined Patent Publications Nos. 6-189361, 6-509456 and 9-187065, and Japanese Patent No. 2760375.

In accordance with those methods, radio-signal channel is assigned to traffic in an order of calling, regardless of whether service rank is high or low, for instance, in a cellular phone.

However, the above-mentioned methods in which radio-signal channel is assigned to traffic in an order of calling include a problem that if radio-channel are occupied by traffics each having a low service rank, it would be impossible to assign radio-signal channel to traffic having a high service rank.

For instance, traffic having a low service rank includes a general call, and traffic having a high service rank includes an urgent call, a hot line and a priority call. In accordance with the above-mentioned methods, if radio-signal channels were occupied by general calls, it would be impossible to assign radio-signal channel to an urgent call.

In one method, if radio-signal channels are occupied by traffics each having a low service rank, and accordingly, radio-signal channel cannot be assigned to traffic having a high service rank, radio lines may be all cancelled in order to let traffic having a high service rank have priority over traffic having a low service rank. Thereafter, traffics having a low service rank are refused to receive.

However, there is traffic which has a low service rank, but includes very important communication. Such traffic is also interrupted in the above-mentioned method.

SUMMARY OF THE INVENTION

In view of the above-mentioned problem in the prior art, it is an object of the present invention to provide a method of assigning service channel to traffic, which method is capable of assigning radio-signal channel to traffic having a high service rank, even if radio-signal channels are all occupied by traffics each having a low service rank.

In one aspect of the present invention, there is provided a method of assigning service channel to traffic in communication system in which a subscriber's terminal is in communication with a base station through radio signals, including the steps of (a) reserving the predetermined number of channels in advance for traffic having a predetermined service rank, and (b) assigning channel preserved in advance, to the traffic having a predetermined service rank, only when there is no channel to be assigned to the traffic having a predetermined service rank.

In accordance with this method, service channels are reserved in advance only for traffic having a predetermined service rank, for instance, traffic having a high service rank. The thus reserved service channels are assigned only to traffic having the predetermined service rank, and not assigned to other traffics. Hence, even if traffic having the predetermined service rank is received after channels other than the above-mentioned reserved channels are occupied by traffics other than traffic having the predetermined service rank, the reserved service channels are assigned to traffic having the predetermined service rank.

Thus, the method solves the above-mentioned problem that it is impossible to assign radio-signal channel to an urgent call, a hot line or a priority call, because radio lines are all occupied by general calls.

It is preferable that the method further includes the step of, if channel having been assigned to traffic other than the traffic having a predetermined service rank is released, after all channels have been assigned, reserving the released channel as channel to be assigned only to the traffic having a predetermined service rank.

In accordance with this embodiment, it would be possible to reserve service channel to be assigned to traffic having the predetermined service rank, even after all channels are occupied by traffics other than the traffic having the predetermined service rank.

In another aspect of the present invention, there is provided a communication system in which a subscriber's terminal is in communication with a base station through radio signals, wherein the base station in advance reserves the predetermined number of channels to be assigned to traffic having a predetermined service rank, only when there is no channel to be assigned to the traffic having a predetermined service rank, the subscriber's terminal transmits a first signal to the base station to request the base station to assign channel to the subscriber's terminal, the base station, on receipt of the first signal, transmits a second signal to the subscriber's terminal which second signal is indicative of free channel to be assigned to the subscriber's terminal, among the predetermined number of channels, and the subscriber's terminal, on receipt of the second signal, assigns channel identified by the second signal to the traffic having a predetermined service rank.

This communication system provides the same advantages as those provided by the above-mentioned method.

It is preferable that if channel having been assigned to traffic other than the traffic having a predetermined service rank is released, after all channels have been assigned, the base station reserves the released channel as channel to be assigned only to the traffic having a predetermined service rank.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENT

A preferred embodiment in accordance with the present invention will be explained hereinbelow with reference to drawings.

Figure 1:
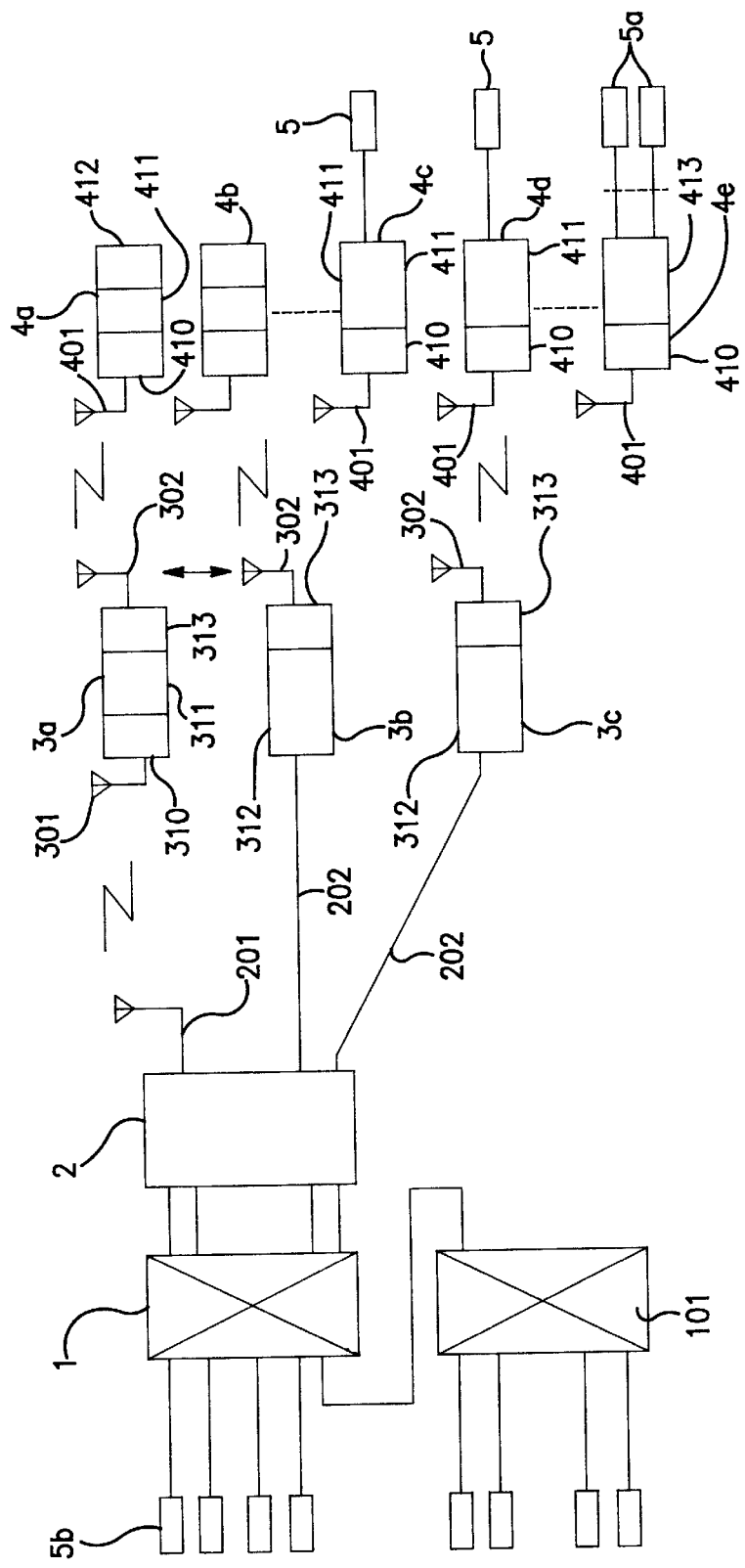
FIG. 1 is a block diagram of an embodiment of a radio-signal communication system in which the method of assigning service-channel to traffic, in accordance with the present invention, is carried out.
Figure 2:
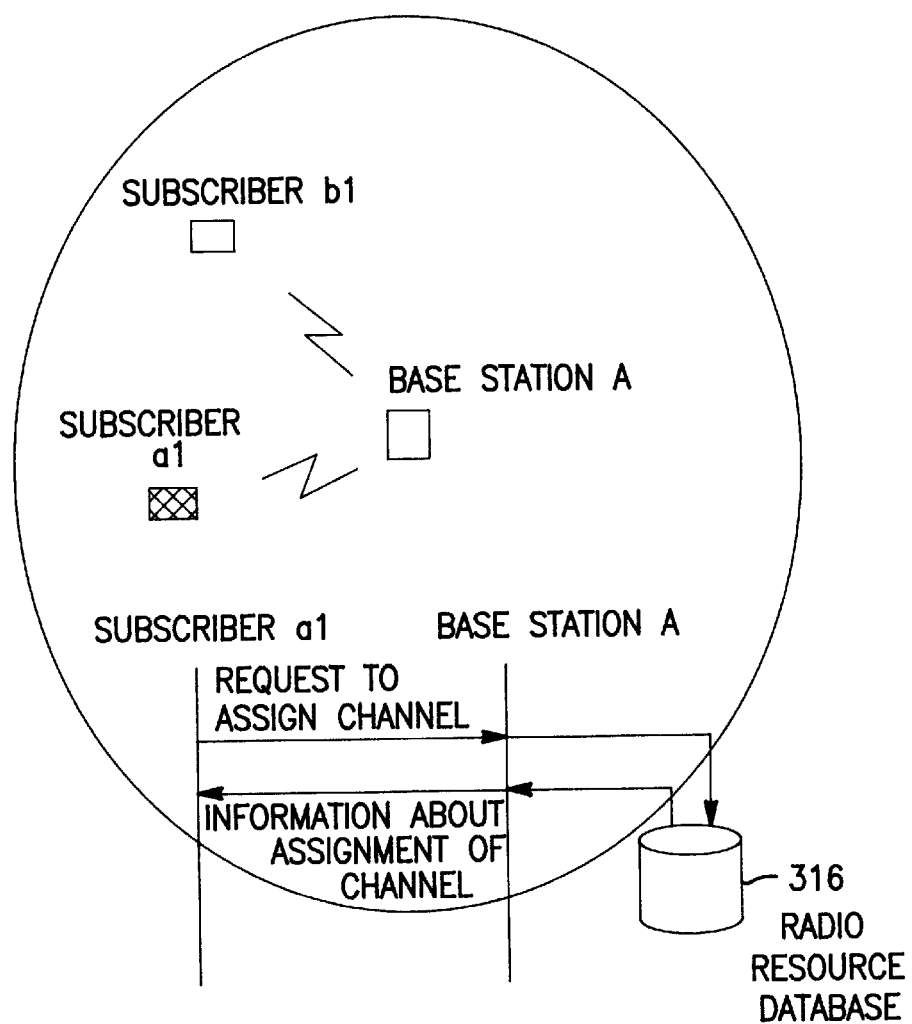
FIG. 2 illustrates a sequence of the radio-signal communication system illustrated in FIG. 1.

FIG. 1 is a block diagram of a radio-signal communication system in which the method of assigning service-channel to traffic, in accordance with the present invention, is carried out, and FIG. 2 illustrates a sequence of the radio-signal communication system illustrated in FIG. 1.

As illustrated in Fig: 1, the radio-signal communication system connects subscriber stations such as a cellular phone to base stations through radio-signals. That is, the illustrated radio-signal communication system defines a wireless local loop. The radio-signal communication system is comprised of an exchanger 1 and a control station 2 exchanging wireless access system with the exchanger 1. As mentioned later, the control station 2 controls base stations.

In the instant embodiment, it is assumed that there exist first to third base stations 3a, 3b and 3c, and first to fifth subscriber stations 4a, 4b, 4c, 4d and 4e. The control station 2 has an antenna 201, and the first base station 3a has first and second antennas 301 and 302. The control station 2 is in communication with the first base station 3a through radio-signals transmitted and received through the antennas 201 and 301. The control station 2 is in communication with the second base station 3b through a cable 202 such as an optical fiber. The control station 2 is further in communication with the third base station 3c through a cable 202 such as an optical fiber.

The first base station 3a is comprised of a first antenna 301 for making radio-signal communication with the control station 2, a second antenna 302 for making radio-signal communication with the first to fifth subscriber stations 4a, 4b, 4c, 4d and 4e, a first circuit 310 for transmitting radio-signals to the control station from the first base station 3a and receiving radio-signals from the control station, a second circuit 311 for demodulating radio-signals transmitted from the control station 2 and producing radio-signals to be transmitted to the control station 2, and a third circuit 313 for producing radio-signals to be transmitted to the first to fifth subscriber stations 4a, 4b, 4c, 4d and 4e.

Each of the second and third base stations 3b and 3c is comprised of a first circuit 312 for converting signals transmitted from the control station 2 through the cable, into radio-signals, a second circuit 313 for producing radio-signals to be transmitted to the first to fifth subscriber stations 4a, 4b, 4c, 4d and 4e, and an antenna 302 for making radio-signal communication with the first to fifth subscriber stations 4a, 4b, 4c, 4d and 4e.

Each of the first and second subscriber stations 4a and 4b is comprised of an antenna 401 for making radio-signal communication with the first to third base stations 3a to 3c, a first circuit 410 for processing radio-signals transmitted from the first to third base stations 3a to 3c and producing radio-signals to be transmitted to the first to third base stations 3a to 3c, a second circuit 411 for converting the received radio-signals to signals to be received in a later mentioned man-machine interface 412, and a man-machine interface 412 including a microphone, a speaker, a display screen and an input device through which data such as a telephone number is input.

Each of the third and fourth subscriber stations 4c and 4d is comprised of an antenna 401 for making radio-signal communication with the first to third base stations 3a to 3c, a first circuit 410 for processing radio-signals transmitted from the first to third base stations 3a to 3c and producing radio-signals to be transmitted to the first to third base stations 3a to 3c, and a second circuit 411 for converting the received radio-signals to signals to be transmitted to a telephone 5 and for connecting the third or fourth subscriber stations 4c or 4d to the telephone The fifth subscriber station 4e is comprised of an antenna 401 for making radio-signal communication with the first to third base stations 3a to 3c, a first circuit 410 for processing radio-signals transmitted from the first to third base stations 3a to 3c and producing radio-signals to be transmitted to the first to third base stations 3a to 3c, and a third circuit 413 for converting the received radio-signals to signals to be transmitted to a plurality of telephones 5a and for connecting the fifth subscriber station 4e to the telephones 5a.

The exchanger 1 is connected to a plurality of telephones 5b.

The radio-signal communication system in accordance with the present embodiment, having such a structure as mentioned above, operates as follows.

The control station 2 downloads information about settings of devices necessary for operating the radio-signal communication system, information about service ranks, the number of channels reserved, and information about subscribers, to the first to third base stations 3a to 3c at any time.

It is assumed that there exist service A and service B, and service A has priority to service B.

When the first and second subscriber stations 4a and 4b make a call or when the third to fifth subscriber stations 4c to 4e receives a call from the telephones 5 and 5a, the first to fifth subscriber stations 4a to 4e transmit both a request for assigning radio-signal channel thereto and content of service to the associated first to third base stations 3a to 3c.

On receipt of the request for assigning radio-signal channel to the subscriber station, the first to third base station 3a to 3c retrieves information about assignment of radio-signal channel, stored in a later mentioned radio resource data base (DB) 316, and transmits free radio-signal channel to the first to fifth subscriber station 4a to 4e which have transmitted the request for assigning radio-signal channel to the subscriber station.

If the service transmitted together with the request is service A, the first to fifth subscriber station 4a to 4e assign the transmitted free radio-signal channel to service A, and further, reserve radio-signal channels in accordance with information indicative of the number of channel to be reserved, (for instance,. 2), which information is downloaded from the control station 2.

Hereinbelow is explained an example of assigning radio-signal channel to service A with reference to FIGS. 4, 5 and 6.

In the example explained hereinbelow, as illustrated in Status 1 in FIG. 4, time-slot has seven channels, and two of the seven channels are in advance reserved to be assigned only to service A.

Figure 4:
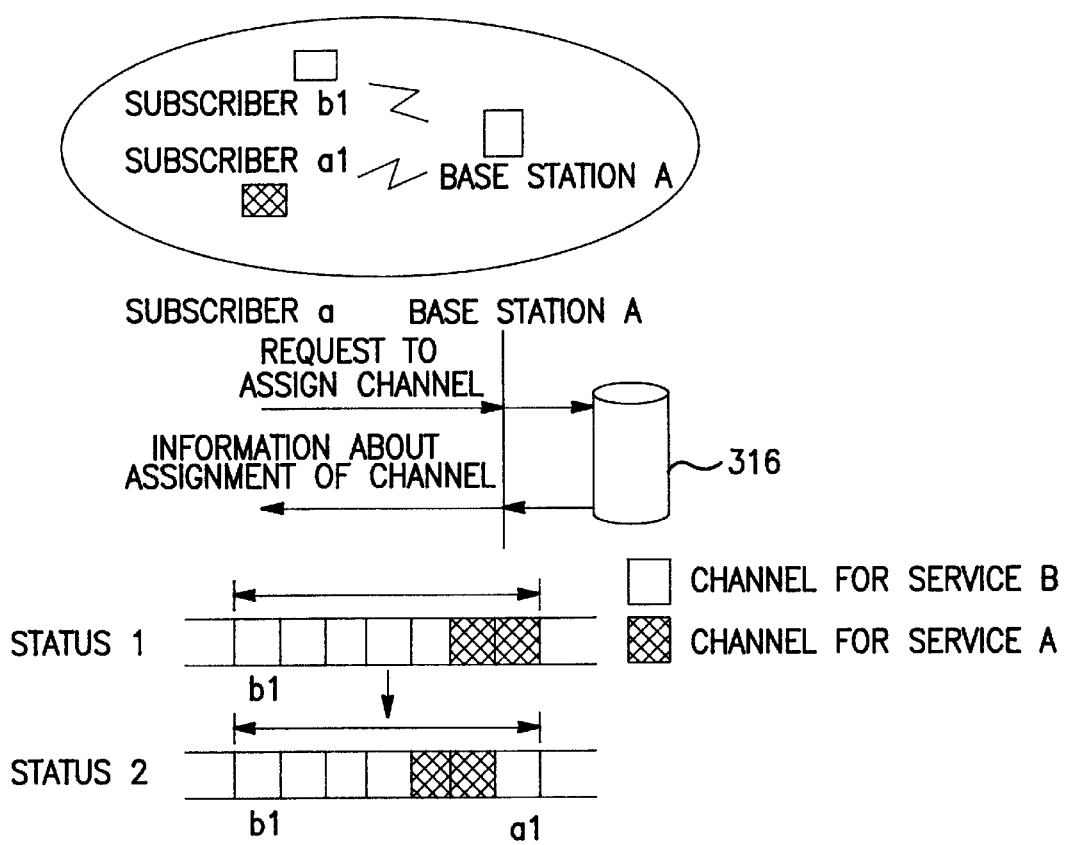
FIG. 4 illustrates time-slot to be used for explaining assignment of radio-signal channel to traffic having a predetermined service rank.

In Status 1 shown in FIG. 4, two channels among seven channels are in advance reserved only for service A, and channel b1 is assigned to service B. If a call of service A is made when time-slot is in Status 1, channel a1 among six free channels other than the channel b1 is assigned to service A, as illustrated in Status 2 in FIG. 4. In Status 2, two channels are still reserved only for service A.

It is assumed that no calls for service B are made, but only calls for service A are made after Status 2. As a result, Status 2 is turned into Status 3 illustrated in FIG. 5.

In Status 3, the channel b1 is assigned to service B, and four channels 1a, a2, a3 and a4 are assigned to service A. Since free channels are reserved only for service A in Status 3, even if a call for service B is made, free channel is not assigned to service B. That is, a call for service B is refused to receive.

Figure 5:
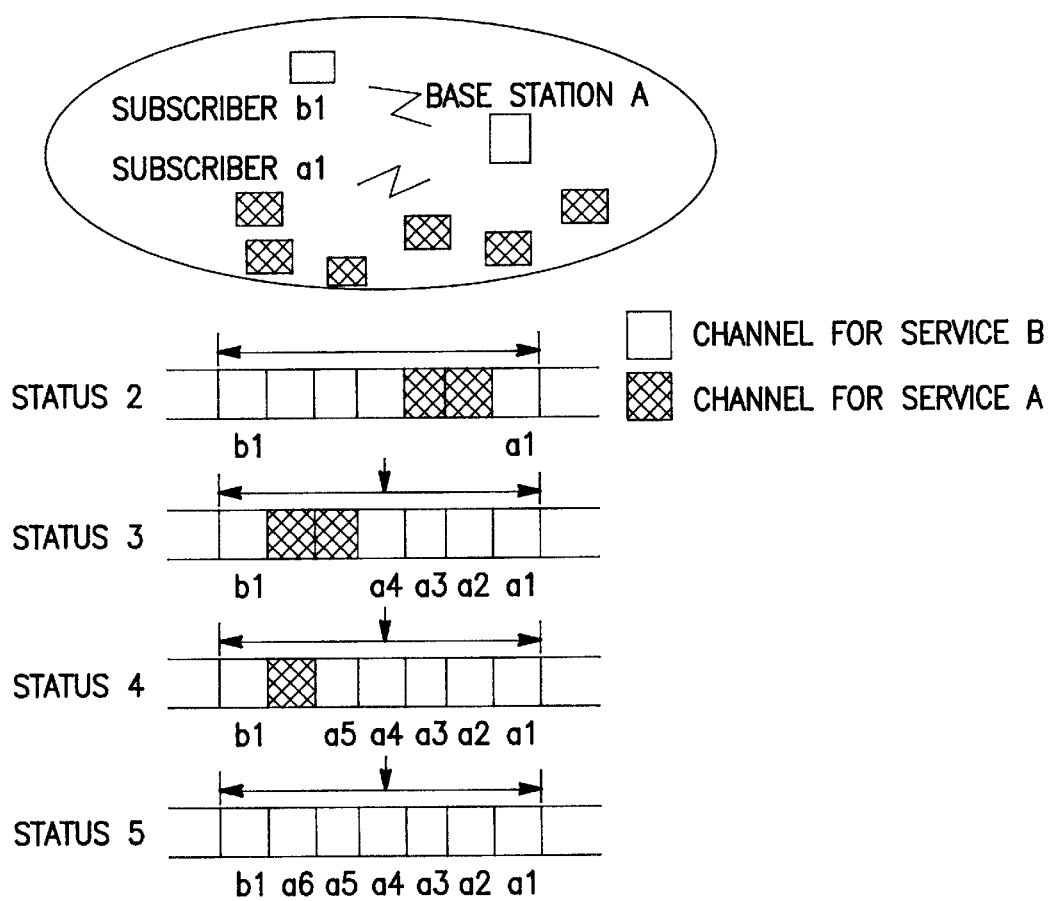
FIG. 5 illustrates another time-slot to be used for explaining assignment of radio-signal channel to traffic having a predetermined service rank.

In contrast, as shown in Status 4 and Status 5 in FIG. 5, when a call for service A is made, one of free channels in advance reserved is assigned to service A. Specifically, when one call for service A is made, channel a 5 is assigned to service A, as shown in Status 4 in FIG. 5, and when two calls both for service A are made, channels a5 and a6 are assigned to services A, as shown in Status 5 in FIG. 5.

Figure 6:
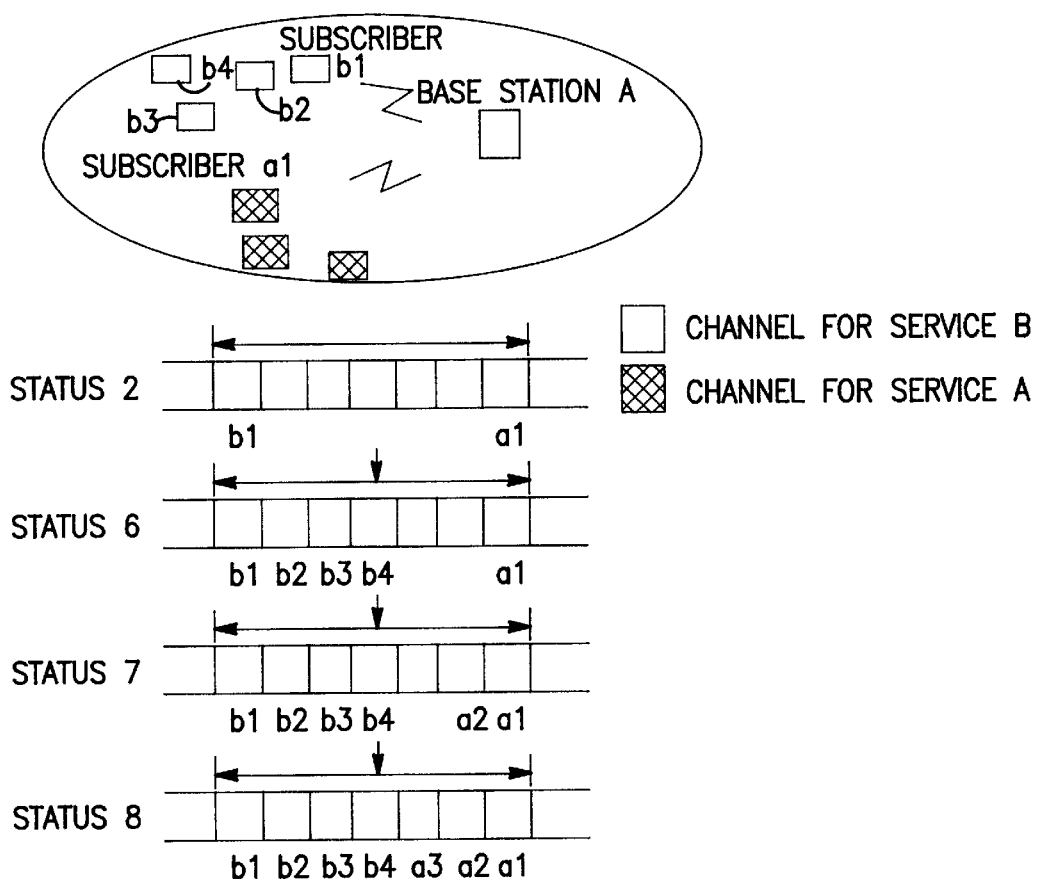
FIG. 6 illustrates still another time-slot to be used for explaining assignment of radio-signal channel to traffic having a predetermined service rank.

Status 6 in FIG. 6 shows an example where calls all for service B are successively made after Status 2.

When three calls all for service B are successively made after Status 2, channels b2, b3 and b3 are assigned to services B, as shown in Status 6.

However, at the time when the channels b2, b3 and b4 are assigned to services B, there is no more channels to be assigned to service B. As a result, it is no longer possible to receive a call for service B. That is, only a call or calls for service A is received hereinafter.

Namely, when a call for service A is made, free channels reserved in advance is assigned to service A, as shown in Status 7 and Status 8 in FIG. 6. Specifically, when one call for service A is made, channel a2 is assigned to service A, as shown in Status 7, and when two calls both for service A are made, channels a2 and a3 are assigned to services A, as shown in Status 8.

Hereinbelow is explained radio-signal communication between one base station and one subscriber station, with reference to FIG. 3.

Figure 3:
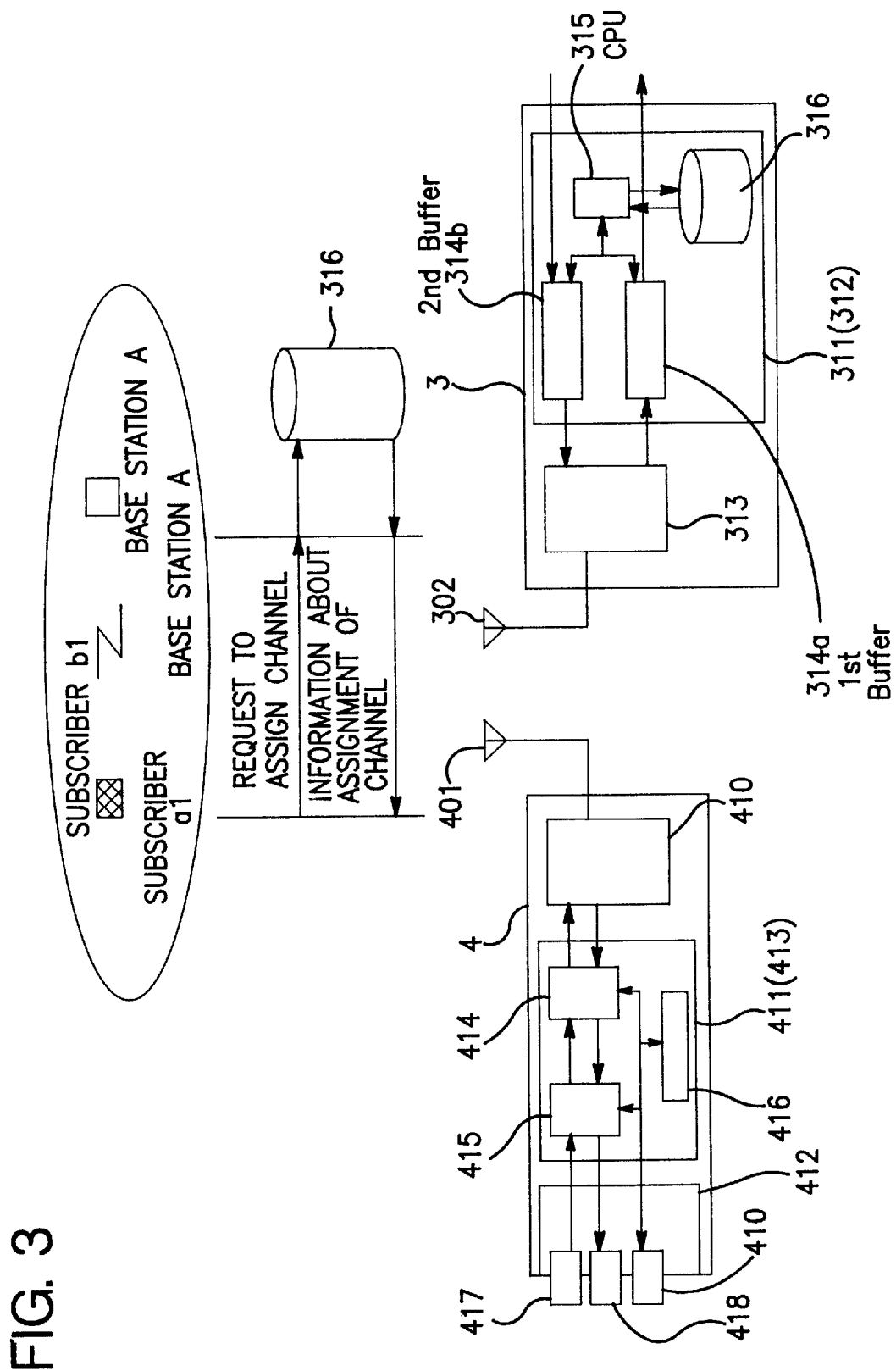
FIG. 3 is a block diagram illustrating examples of a base station and a subscriber station.

FIG. 3 is a block diagram illustrating an example of a base station 3 and a subscriber station 4.

As illustrated in FIG. 3, the base station 3 is comprised of an antenna 302, a converter circuit 313 for demodulating radio-signals received through the antenna 302, and a control circuit 311 operably connected to the converter circuit 313.

The control circuit 311 is comprised of a first buffer circuit 314a for receiving radio-signals, a second buffer circuit 314b for transmitting radio-signals, a central processing unit 315 electrically connected to both the first and second buffer circuits 314a and 314b, and a radio resource data base 316 electrically connected to the central processing unit 315.

The subscriber station 4 is comprised of an antenna 401 for making radio-signal communication with the base station 3, a first circuit 410 for processing radio-signals transmitted from the base station 3 and producing radio-signals to be transmitted to the base station 3, a second circuit 411 for converting the received radio-signals to signals to be received in a later mentioned man-machine interface 412, and a man-machine interface 412 including a microphone, a speaker, a display screen and an input device through which data such as a telephone number is input.

The second circuit 411 is comprised of a circuit 414 for transmitting base band signals to the first circuit 410 and receiving base band signals from the first circuit 410, a converter circuit 415 for converting the base band signals into signals to be received by the man-machine interface 412, and a central processing unit 416.

The man-machine interface 412 is connected to a microphone and speaker 417, an interface 418 through which data communication is made, and an input board 419 through which data such as a telephone number is input.

Radio-signal communication between the base station 3 and the subscriber station 4 is made as follows.

When a telephone number is input through the input board 419 to the man-machine interface 412, the input of the telephone number acts as a trigger to thereby cause the central processing unit 416 to produce a first signal including both a request to assign radio-signal channel and data about service. The first signal including the request to assign radio-signal channel is converted into a radio-signal in the first circuit, and is transmitted to the base station 3 through the antenna 401.

The central processing unit 315 in the base station 3 receives the first signal through the antenna 302, the converter circuit 313 and the first buffer circuit 314a.

Then, the central processing circuit 315 receives channel status data from the radio resource database 316, based on the data about service included in the received first signal. Herein, channel status data indicates which channels are assigned and which channels are not assigned.

Then, the central processing unit 315 transmits a second signal to the second buffer circuit 314b. The second signal includes information about assignment of free radio-signal channels. The second signal is transmitted to the subscriber station 4 through the converter circuit 313 and the antenna 302.

On receipt of the second signal, the subscriber station 4 uses channel designated by the second signal, that is, the information about assignment of free radio-signal channels, to thereby be able to receive and transmit data.

As having explained so far, in accordance with the present embodiment, channels to be assigned only for service A are in advance reserved. The reserved channels are assigned only to traffic of service A, and are not assigned to traffics of service B. Hence, even if traffic of service A is received after channels other than channels to be assigned only to traffics of service A have been all assigned to traffics of service B, radio-signal channels reserved in advance is assigned to traffic of service A.

Thus, the present embodiment solves the problem which prior art cannot solve, that it is impossible to assign radio-signal channel to an urgent call, a hot line or a priority call, because radio lines are all occupied by general calls.

It is to be understood that the present embodiment is not to be limited to the above-mentioned structure, and that the present embodiment includes alternatives, modifications and equivalents as follows.

In the above-mentioned embodiment, the exchanger 1 is in communication with the control station 2 through a cable. However, the exchanger 1 may be in communication with the control station 2 through radio-signals.

When the exchanger 1 is connected to ground network, the exchanger 1 may be connected directly to the telephones 5a, or the exchanger 1 may be the telephones 5a through PBX exchanger 101, as illustrated in FIG. 1.

The control station 2 may be in communication with the first to third base stations 3a to 3c through any medium, if signals can be transferred through the medium. For instance, the medium includes radio-signal, an optical fiber and a metal wire.

The control station 2 may be accessible to the first to third base stations 3a to 3c in point-to-point system or in point-to-multi-point system.

When the first to third base stations 3a to 3c are connected to the first to fifth subscriber stations 4a to 4e through radio-signals, multiplexing is carried out in point-to-multi-point or point-to-point system, and there may be selected from any one of TDMA, TDMA/TDD, FDMA, FDMA/TDD and CDMA.

The first to third base stations 3a to 3c may be accessible through radio-signals to the first to fifth subscriber stations 4a to 4e through one of GSM, AMPS, PDC, PCS, EDCT and PHS systems.

The first to fifth subscriber stations 4a to 4e may be connected to a single telephone or a plurality of telephones.

It is no longer possible to reserve channels to be assigned to service A, in both Status 5 illustrated in FIG. 5 and Status 8 illustrated in FIG. 6. However, if channel having been assigned to service B is released, the channel may be reserved as channel to be assigned only to service A.

If one or more channel(s) is(are) released after the predetermined number of channels have been reserved for service A, the released channel(s) may be assigned to service B.

While the present invention has been described in connection with certain preferred embodiments, the present invention provides advantages as follows.

In accordance with the present invention, service channels are reserved in advance only for traffic having a predetermined service rank, for instance, traffic having a high service rank. The thus reserved service channels are assigned only to traffic having the predetermined service rank, and not assigned to other traffics. Hence, even if traffic having the predetermined service rank is received after channels other than the above-mentioned reserved channels are occupied by traffics other than traffic having the predetermined service rank, the reserved service channels are assigned to traffic having the predetermined service rank.

Thus, the present invention solves the above-mentioned problem which cannot be solved by the conventional methods, that it is impossible to assign radio-signal channel to an urgent call, a hot line or a priority call, because radio lines are all occupied by general calls.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 11-160628 filed on Jun. 8, 1999 including specification, claims, drawings and summary is incorporated herein by reference in its entirety.

What is claimed is:

1. A method of assigning service channels to traffic in a communication system in which a subscriber's terminal is in communication with a base station through radio signals, comprising the steps of:

(a) reserving a predetermined number of channels in advance for only high priority traffic having a predetermined highest service rank; and (b) assigning the channels reserved in advance, to said high priority traffic, only when there is no other unassigned channel to be assigned to said high priority traffic, wherein, prior to assigning high priority traffic to unassigned channels reserved for only high priority traffic, high priority traffic is assigned to channels that are unassigned;

high priority traffic is assigned to unassigned channels reserved only for high priority traffic only when all unreserved channels are assigned; and a low priority traffic is refused to be assigned to an unassigned channel reserved for only high priority traffic when all remaining channels are assigned.

2. The method as set forth in claim 1, further comprising the step of, if a channel having been assigned to traffic other than said high priority traffic having the predetermined highest service rank is normally ended and released, after all channels have been assigned, reserving the released channel as channel to be assigned only to said high priority traffic having the predetermined highest service rank.

3. A communication system in which a subscriber's terminal is in communication with a base station through radio signals, wherein said base station in advance reserves a predetermined number of channels to be assigned to only high priority traffic having a predetermined highest service rank for use only when there is no other channel available to be assigned to said high priority traffic, said subscriber's terminal transmits a first signal to said base station to request said base station to assign channel to said subscriber's terminal, said base station, on receipt of said first signal, transmits a second signal to said subscriber's terminal which second signal is indicative of a free channel to be assigned to said subscriber's terminal, among said predetermined number of channels when no other channel is available to be assigned, and said subscriber's terminal, on receipt of said second signal, assigns channel identified by said second signal to said high priority traffic, wherein, prior to assigning high priority traffic to unassigned channels reserved for only high priority traffic, high priority traffic is assigned to channels that are unassigned;

high priority traffic is assigned to unassigned channels reserved only for high priority traffic only when all unreserved channels are assigned; and a low priority traffic is refused to be assigned to an unassigned channel reserved for only high priority traffic when all remaining channels are assigned.

4. The communication system as set forth in claim 3, wherein if channel having been assigned to traffic other than said high priority traffic having a predetermined highest service rank is normally ended and released, after all channels have been assigned, said base station reserves the released channel as another channel to be assigned only to said high priority traffic having the predetermined highest service rank.

5. A method of assigning service channels to traffic in a communication system in which a subscriber's terminal is in communication with a base station through radio signals, comprising the steps of:

reserving a fixed number of channels in advance as high priority traffic only channels;

reserving another fixed number of channels in advance for low priority traffic, the reserving of the channels as high priority traffic only channels and the channels for low priority traffic leaving some channels unreserved;

prior to assigning high priority traffic to unassigned channels reserved as high priority traffic only channels, assigning high priority traffic to channels that are unassigned;

assigning high priority traffic to unassigned channels reserved as high priority traffic only channels only when all unreserved channels are assigned; and refusing to assign a low priority traffic to an unassigned channel reserved as high priority traffic only channels when all remaining channels are assigned.

6. The method of claim 5, comprising the further steps of:

determining if the channels reserved as high priority traffic only channels are assigned to traffic; and upon a channel assigned to low priority traffic being normally released to become a released channel, reserving the released channel as a high priority traffic only channel.

7. The method of claim 5, wherein at least one channel is reserved in advance as the fixed number of channels reserved for low priority traffic.

* * * * *